United States Patent
Hung

(10) Patent No.: US 8,300,176 B2
(45) Date of Patent: Oct. 30, 2012

(54) LIQUID CRYSTAL DISPLAY DEVICE HAVING FIRST AND SECOND REFLECTIVE TYPE POLARIZERS AND A RETARDER HAVING RETARDING AND NON-RETARDING REGIONS AND BACKLIGHT MODULE THEREOF

(75) Inventor: Chen-Pin Hung, Tainan County (TW)

(73) Assignee: Chimei Innolux Corporation, Miao-Li County (TW)

( * ) Notice: Subject to any disclaimer, the term of this patent is extended or adjusted under 35 U.S.C. 154(b) by 48 days.

(21) Appl. No.: 12/875,795

(22) Filed: Sep. 3, 2010

(65) Prior Publication Data

US 2010/0328577 A1 Dec. 30, 2010

Related U.S. Application Data

(62) Division of application No. 12/101,205, filed on Apr. 11, 2008, now abandoned.

(30) Foreign Application Priority Data

Apr. 13, 2007 (TW) ................ 96112988 A

(51) Int. Cl.
*G02F 1/1335* (2006.01)
*F21V 9/14* (2006.01)
(52) U.S. Cl. ............ 349/65; 349/96; 349/117; 362/19
(58) Field of Classification Search ............ 349/65, 349/96
See application file for complete search history.

(56) References Cited

U.S. PATENT DOCUMENTS

| | | | |
|---|---|---|---|
| 5,816,677 A | 10/1998 | Kurematsu et al. | |
| 6,175,396 B1 * | 1/2001 | Kim et al. | 349/58 |
| 2001/0017774 A1 | 8/2001 | Ito et al. | |
| 2002/0063817 A1 * | 5/2002 | Nauta et al. | 349/65 |
| 2003/0071945 A1 | 4/2003 | Kim | |
| 2005/0151896 A1 * | 7/2005 | Hara et al. | 349/96 |
| 2005/0219836 A1 | 10/2005 | Hung | |
| 2005/0276072 A1 | 12/2005 | Hayashi et al. | |
| 2007/0103908 A1 | 5/2007 | Tabito et al. | |
| 2007/0121023 A1 * | 5/2007 | Yang | 349/58 |

FOREIGN PATENT DOCUMENTS

| | | |
|---|---|---|
| CN | 1144913 A | 3/1997 |
| CN | 1842737 A | 10/2006 |
| JP | 8-153405 A | 6/1996 |

OTHER PUBLICATIONS

Taiwanese Office Action 10020559990 issued Jun. 28, 2011.

* cited by examiner

*Primary Examiner* — Mark Robinson
*Assistant Examiner* — Dennis Y. Kim
(74) *Attorney, Agent, or Firm* — Lowe Hauptman Ham & Berner LLP

(57) ABSTRACT

A backlight module includes a reflection sheet and a film structure disposed above the reflection sheet with a gap therebetween. A light source is disposed in the gap between the reflection sheet and the film structure so as to provide light. The film structure includes a first region for reflecting light incident thereupon from the light source and the reflection sheet, and a plurality of second regions for transmitting at least partially light incident thereupon from the light source and the reflection sheet.

16 Claims, 9 Drawing Sheets

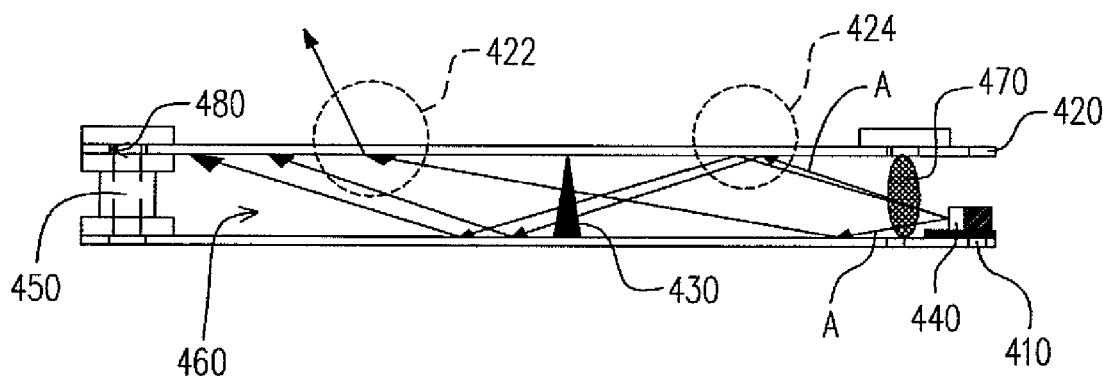
FIG. 8    400a
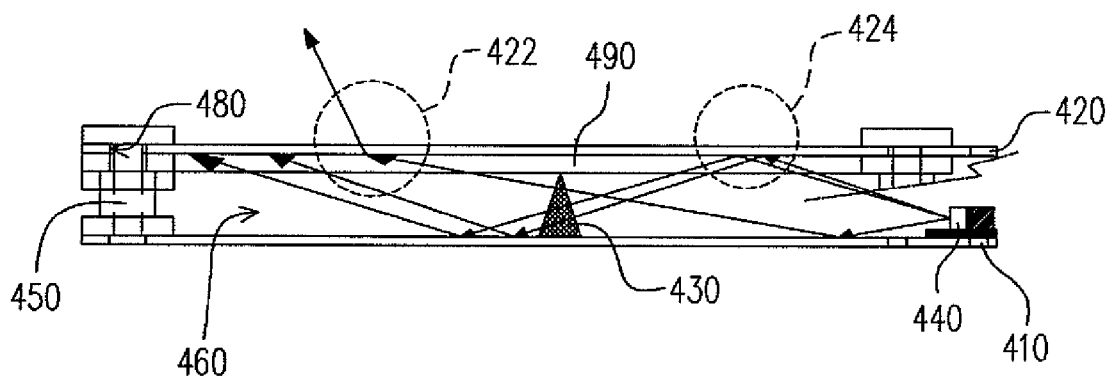
FIG. 9    400b
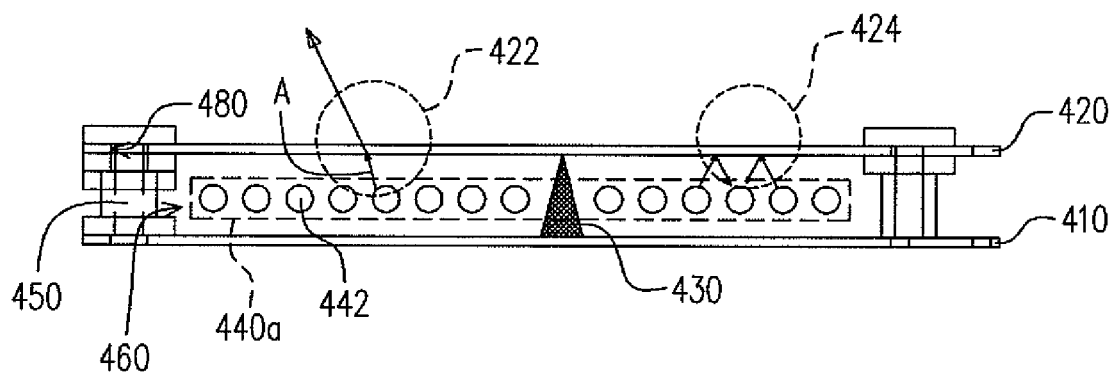
FIG. 10    400c

LIQUID CRYSTAL DISPLAY DEVICE HAVING FIRST AND SECOND REFLECTIVE TYPE POLARIZERS AND A RETARDER HAVING RETARDING AND NON-RETARDING REGIONS AND BACKLIGHT MODULE THEREOF

This application is a divisional of U.S. Ser. No. 12/101,205, filed Apr. 11, 2008 and claims the benefit of Taiwan application Serial No. 96112988, filed Apr. 13, 2007, the entirety of which is incorporated herein by reference.

BACKGROUND

1. Technical Field

The disclosure relates to a display and a backlight module thereof, and more particularly, to a liquid crystal display and a backlight module thereof.

2. Description of Related Art

With the progress in modern visual information technologies, the liquid crystal display (LCD) has been widely applied to the display screen of consumer electronic products, such as mobile phones, notebook personal computers, personal computers (PCs) and personal digital assistants (PDAs). However, as the LCD panel in an LCD device is incapable of emitting light, a backlight module is required to be disposed under the LCD panel to provide the light source for the LCD panel, thus enabling the LCD panel to display images.

Generally, backlight modules are divided into direct type backlight modules and side incident type backlight modules. The direct type backlight modules are usually applied to large-sized LCDs, whereas the side incident type backlight modules are usually adopted in small-sized LCDs.

FIG. 1 is a schematic view of a conventional side incident backlight module. Referring to FIG. 1, a side incident type backlight module 100 includes a light guide plate (LGP) 130, a plurality of cold cathode fluorescent lamps 120, a lamp holder 110 and an optical film 140. The light guide plate 130 has an incident surface 114 and an emitting surface 116. The cold cathode fluorescent lamps 120 are disposed adjacent to the incident surface 114 of the light guide plate 130 and inside the lamp holder 110. Moreover, the optical film 140 is disposed on the emitting surface 116 of the light guide plate 130. Light emitted from the cold cathode fluorescent lamps 120 would either directly propagate towards the light guide plate 130, or the light would be first reflected by the lamp holder 110, then propagate towards the light guide plate 130 and finally emit from the emitting surface 116 of the light guide plate 130. The function of the light guide plate 130 is to convert light emitted by the cold cathode fluorescent lamps 120 from a line source to a surface source.

Since a thick and heavy light guide plate 130 is adopted in the side incident type backlight module 100, the side incident type backlight module 100 has the problem of overweight. Furthermore, if the side incident type backlight module 100 is applied to large-sized LCDs, the disadvantages of low yield rate and tendency to warping in large-sized light guide plates 130 would arise.

SUMMARY OF THE INVENTION

There is a need for a backlight module and/or a liquid crystal display (LCD) which is flexible and does not require a light guide plate or a diffusion plate.

In an aspect, the invention provides a backlight module including a reflection sheet, a first reflective type polarizer, a light source, a retarder and a second reflective type polarizer. The first reflective type polarizer is disposed above the reflection sheet with a gap therebetween. The light source is disposed in the gap between the reflection sheet and the first reflective type polarizer to provide light. The retarder is disposed on the first reflective type polarizer and has a plurality of retarding regions and a non-retarding region. The second reflective type polarizer is disposed on the retarder. Light provided by the light source penetrates the second reflective type polarizer through the functioning of the retarding regions.

According to one embodiment, the first reflective type polarizer and the second reflective type polarizer are linear polarizers. Linear polarization directions of the first reflective type polarizer and the second reflective type polarizer are perpendicular to each other.

According to one embodiment, the first reflective type polarizer and the second reflective type polarizer are circular polarizers. Circular polarization directions of the first reflective type polarizer and the second reflective type polarizer are opposite to each other. In addition, the backlight module may further include a ¼ wavelength retarder disposed on the second reflective type polarizer.

According to one embodiment, the light source of the backlight module is located along an edge of the reflection sheet and emits light towards a central region of the reflection sheet. Additionally, the backlight module may further include a lens disposed on a light-emitting path of the light source.

According to one embodiment, the light source includes a plurality of light-emitting elements distributed evenly on the reflection sheet.

According to one embodiment, the backlight module further includes a plurality of fasteners for fixing relative positions of the reflection sheet, the first reflective type polarizer, the retarder and the second reflective polarizer. The reflection sheet, the first reflective type polarizer, the retarder and the second reflective type polarizer have a plurality of through holes respectively. The fasteners run through the through holes to fasten the reflection sheet, the first reflective type polarizer, the retarder and the second reflective type polarizer. A largest dimension of at least one of the through holes is larger than a largest external diameter of the respective fasteners.

According to one embodiment, the reflection sheet, the first reflective type polarizer, the retarder and the second reflective type polarizer are flexible.

In one embodiment, the backlight module further includes a support disposed between the reflection sheet and the first reflective type polarizer so as to maintain the gap therebetween. The backlight module may further include a transparent support plate disposed between the first reflective type polarizer and the support.

In one embodiment, the retarder is a ½ wavelength retarder.

In one embodiment, a total area of the retarding regions per unit area of the retarder increases as the retarding regions are farther away from the light source.

In another aspect, the invention further provides a backlight module including a reflection sheet, a selective reflection sheet and a light source. The selective reflection sheet is disposed above the reflection sheet with a gap therebetween, and has a plurality of transparent regions and a reflective region. The light source is disposed in the gap between the reflection sheet and the selective reflection sheet so as to provide light.

In one embodiment, a total area of the transparent regions per unit area of the selective reflection sheet increases as the transparent region are farther away from the light source.

In a further aspect, the invention further provides a backlight module including a reflection sheet, a film structure disposed above the reflection sheet with a gap therebetween, and a light source disposed in the gap between the reflection sheet and the film structure so as to provide light. The film structure includes a first region for reflecting light incident thereupon from the light source and the reflection sheet, and a plurality of second regions for transmitting at least partially light incident thereupon from the light source and the reflection sheet.

In one embodiment, a total area of the second regions per unit area of the film structure increases as the second regions are farther away from the light source.

In another embodiment, the backlight module is a side incident type backlight module wherein the light source is located along an edge of the reflection sheet and emits light towards a central region of the reflection sheet, and the second regions are distributed on the film structure such that a surface source with uniform luminance is provided at a top side of the film structure.

In yet a further aspect, the invention further provides an LCD including an LCD panel and a backlight module of any of the types disclosed above. The backlight module is disposed under the LCD panel.

Additional aspects and advantages of the disclosed embodiments are set forth in part in the description which follows, and in part are apparent from the description, or may be learned by practice of the disclosed embodiments. The aspects and advantages of the disclosed embodiments may also be realized and attained by means of the instrumentalities and combinations particularly pointed out in the appended claims.

BRIEF DESCRIPTION OF THE DRAWINGS

The accompanying drawings are included to provide a further understanding of embodiments of the invention, and are incorporated in and constitute a part of this specification.

FIG. 8 illustrates a schematic cross-sectional view of a backlight module according to another embodiment of the invention.

FIG. 9 illustrates a cross-sectional view of a backlight module having a transparent support plate according to another embodiment of the invention.

FIG. 10 illustrates a schematic cross-sectional view of a backlight module according to yet another embodiment of the invention.

DESCRIPTION OF EMBODIMENTS

Figure 1:
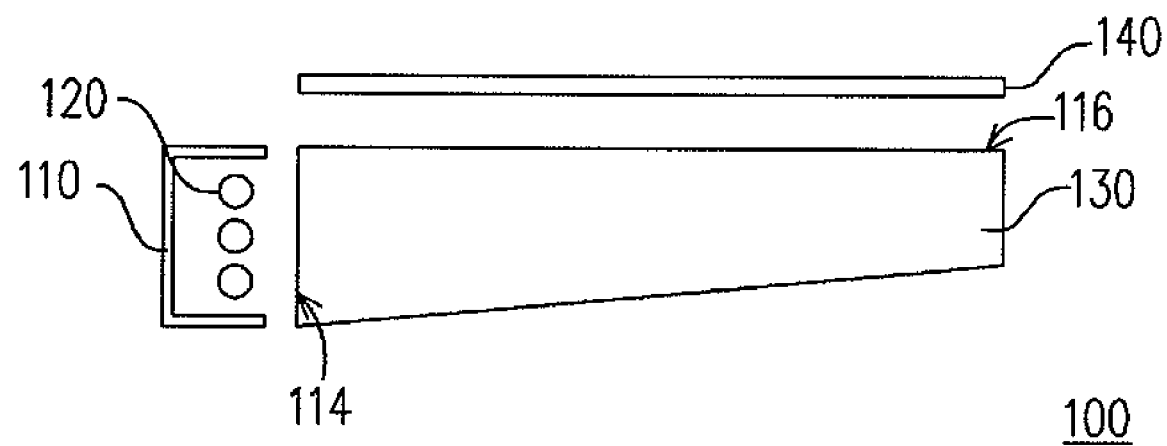
FIG. 1 illustrates a schematic view of a conventional side incident type backlight module.

Reference will now be made in detail to the present embodiments of the invention, examples of which are illustrated in the accompanying drawings. Wherever possible, the same reference numbers are used in the drawings and the description to refer to the same or like parts.

Figure 2A:
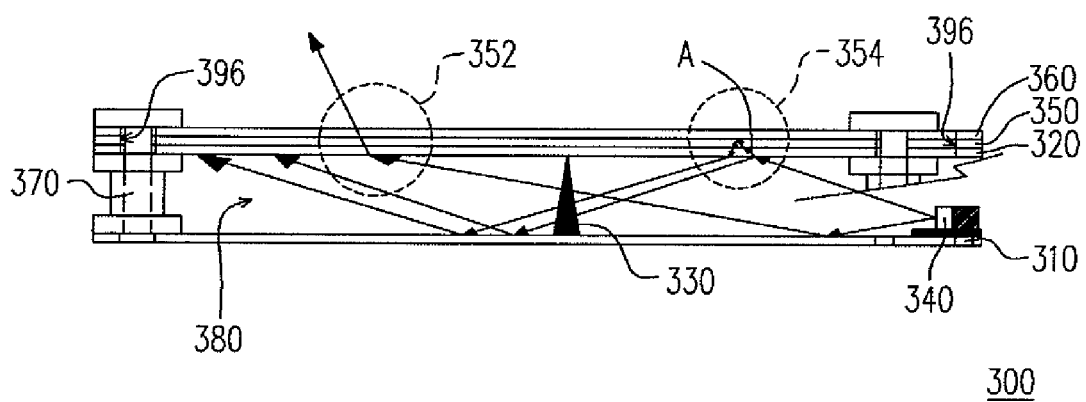
FIG. 2A illustrates a schematic cross-sectional view of a backlight module according to one embodiment of the present invention.
Figure 2B:
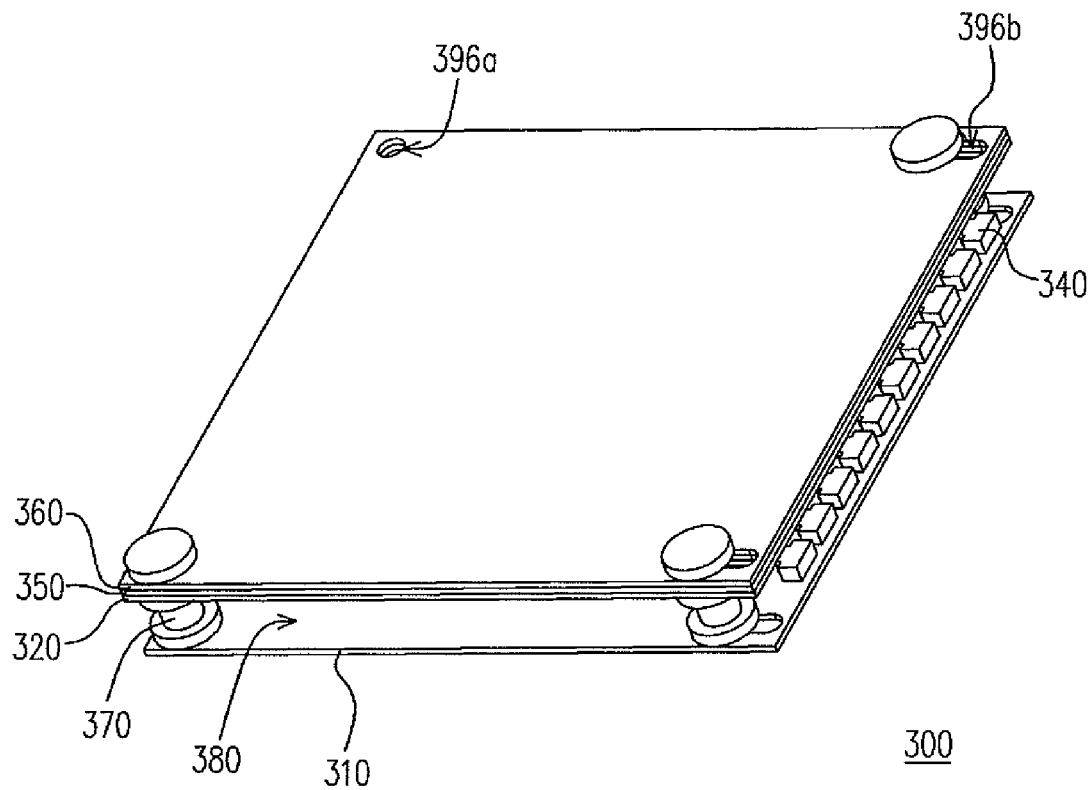
FIG. 2B illustrates a three-dimensional schematic view of the backlight module of FIG. 2A.

FIG. 2A illustrates a schematic cross-sectional view of a backlight module according to one embodiment of the present invention. FIG. 2B illustrates a three-dimensional schematic view of the backlight module of FIG. 2A. Referring to FIGS. 2A and 2B, a backlight module 300 includes a reflection sheet 310, a first reflective type polarizer 320, a light source 340, a retarder 350 and a second reflective type polarizer 360. The first reflective type polarizer 320 is disposed above the reflection sheet 310 and a gap 380 is formed therebetween. The light source 340 is disposed between the reflection sheet 310 and the first reflective type polarizer 320 to provide light. The light source 340 of the present embodiment is located along an edge of the reflection sheet 310 and emits light towards a central region of the reflection sheet 310. Furthermore, the light source 340 includes at least one light-emitting element. The light-emitting element may be a light emitting diode (LED), a cold cathode fluorescent lamp or other suitable light sources. The light source 340 including a plurality of light emitting diodes (LEDs) as shown in FIG. 2B serves as an example herein. The retarder 350 is disposed on the first reflective type polarizer 320. The second reflective type polarizer 360 is disposed on the retarder 350. In other words, the retarder 350 is disposed between the first reflective type polarizer 320 and the second reflective type polarizer 360.

In the present embodiment, the backlight module 300 may further include at least one support 330 disposed between the reflection sheet 310 and the first reflective type polarizer 320 so as to maintain the gap 380. The supports 330 may be constituted by transparent or reflective materials, and the number of the supports 330 may be selected to meet actual needs. Additionally, the backlight module 300 may further include a plurality of fasteners 370 for fixing the relative positions of the reflection sheet 310, the first reflective type polarizer 320, the retarder 350 and the second reflective type polarizer 360. The fasteners 370 are located, for example, at corners of the foregoing films as shown in FIG. 2B.

Figure 2C:
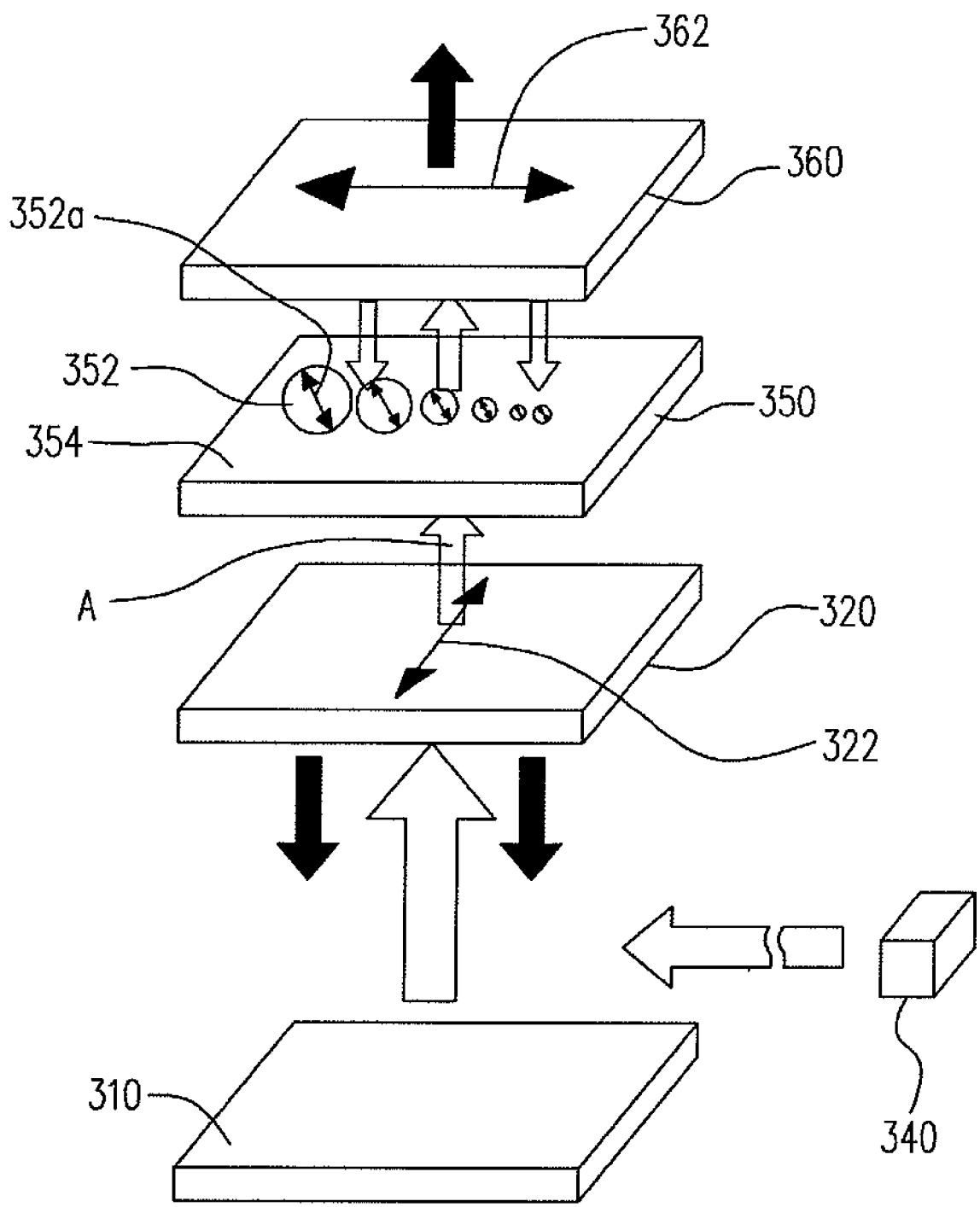
FIG. 2C is a schematic view illustrating the relative positions of the films in the backlight module of FIG. 2A.

FIG. 2C is a schematic view illustrating the relative positions of the films in the backlight module of FIG. 2A. The support(s) and the fasteners of the backlight module are not illustrated in FIG. 2C. Referring to FIGS. 2A and 2C, the retarder 350 has a plurality of retarding regions 352 and at least one non-retarding region 354. Light A provided by the light source 340 penetrates the second reflective type polarizer 360 through the functioning of the retarding regions 352. A method for forming the retarder 350 includes, for example, selectively printing a retarding material on a transparent film. An area printed with the retarding material defines the retarding region 352, whereas an area without the retarding material defines the non-retarding region 354. In the present embodiment, a total area of the retarding regions 352 per unit area on the retarder 350 increases, preferably gradually, as the retarding regions are farther away from the light source 340. The result can be achieved by several different designs. For example, as illustrated in FIG. 2C, an area of each of the retarding regions 352 gradually increases as the retarding region gets farther away from the light source 340. Alternatively, the areas of the retarding regions 352 are the same, but the number of the retarding regions 352 per unit area gradually increases as the retarding regions are farther away from the light source 340.

In the embodiment, the second reflective type polarizer 360 and the first reflective type polarizer 320 are linear polarizers as shown in FIG. 2C, for example. A linear polarization direction 322 of the first reflective type polarizer 320 is perpendicular to a linear polarization direction 362 of the second reflective type polarizer 360. Moreover, in the embodiment, the retarder 350 is, for example, a ½ wavelength retarder, which means the retarding regions 352 are likewise ½ wavelength retarding regions, for example. Each retarding region 352 has a fast axis 352a and a slow axis (not illustrated), and the fast axis 352a and the slow axis are perpendicular to each other. After passing through the retarding regions 352, a phase of the light A whose electric field is parallel to the slow axis is 180 degrees behind a phase of the light A whose electric field is parallel to the fast axis 352a. The fast axis 352a is disposed at an angle of 45 degrees with respect to the linear polarization direction 322 of the first reflective type polarizer 320 and the linear polarization direction 362 of the second reflective type polarizer 360. Thus, after a portion of the light A passing through the first reflective type polarizer 320 penetrates the retarding regions 352, the linear polarization direction of the portion of the light A is rotated 90 degrees and then it passes through the second reflective type polarizer 360. However, a portion of the light A passing through the non-retarding regions 354 does not change its linear polarization direction, and therefore is reflected by the second reflective type polarizer 360 and cannot pass through it. The portion of the light A reflected by the second reflective type polarizer 360 is reflected by the reflection sheet 310 and thus can be utilized again after penetrating the retarder 350 and the first reflective type polarizer 320. Moreover, since the total area of the retarding regions 352 per unit area gradually increases as the retarding regions are farther away from the light source, for the light A penetrating the second reflective type polarizer 360, a luminous flux per unit area of the light A in regions closer to the light source 340 is approximate to a luminous flux per unit area of the light A in regions farther from the light source 340. Hence, a surface source of uniform luminance can be obtained.

Figure 2D:
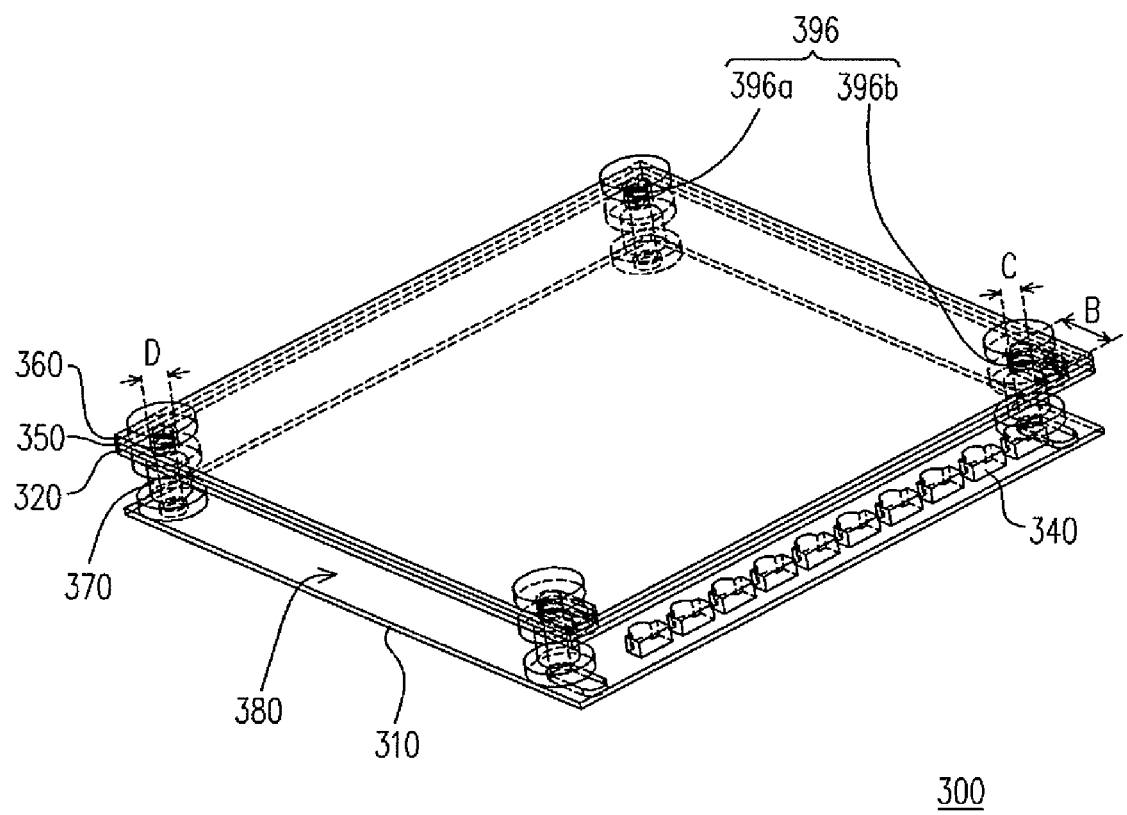
FIG. 2D is a see-through perspective view similar to FIG. 2B.
Figure 2E:
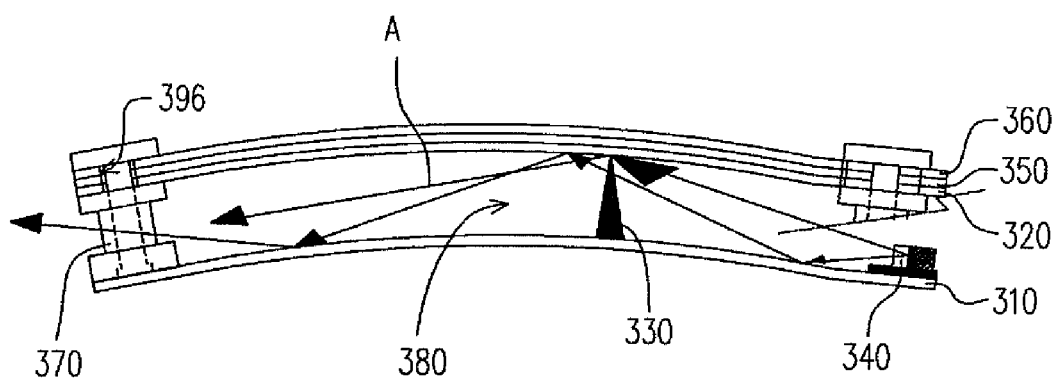
FIG. 2E illustrates a schematic view of the warped backlight module of FIG. 2A.

FIG. 2D is a see-through perspective view similar to FIG. 2B, and FIG. 2E is a schematic view of the warped backlight module of FIG. 2A. Referring to FIGS. 2A, 2B, 2D and 2E, in the present embodiment, the reflection sheet 310, the first reflective type polarizer 320, the retarder 350 and the second reflective type polarizer 360 have a plurality of through holes 396 respectively. The fasteners 370 run through the through holes 396 to fasten the reflection sheet 310, the first reflective type polarizer 320, the retarder 350 and the second reflective type polarizer 360. All the aforementioned fastened films are flexible, for example. The through holes 396 are divided into a first through hole 396a and a second through hole 396b. In FIG. 2B, one of the fasteners 370 is removed for showing one through hole 396a. A largest dimension B of the second through hole 396b is larger than a largest external diameter C of the fasteners 370. For example, the second through hole 396b can be fabricated as a slot as shown in FIG. 2B. If the backlight module 300 is warped (as illustrated in FIG. 2E), the fasteners 370 may slide along a longitudinal direction of such slot, i.e., the largest dimension B, in the second through hole 396b. A diameter D of the first through hole 396a is approximate to the largest external diameter C of the fasteners 370 and ensures a good fastening effect of the fasteners 370. With a combination of the first through hole 396a, the second through hole 396b and the fasteners 370, not only the backlight module 300 is suitable for proper functioning even when it is being warped, but all the films in the backlight module 300 can also be well fastened.

According to the aforementioned description, the backlight module 300 of the embodiment produces a surface source of uniform luminance by using the combination of the reflection sheet 310, the first reflective type polarizer 320, the retarder 350 and the second reflective type polarizer 360, and a thick and heavy light guide plate is not required unlike the conventional side incident type backlight module. Therefore, the backlight module 300 has the advantages of thinner thickness and lighter weight. Furthermore, the backlight module 300 does not employ any elements that are difficult to warp, such as a light guide plate or a diffusion plate, so that it can be easily designed as a flexible type backlight module. In addition, when the backlight module 300 is of a larger size (such as those applied in large-sized LCDs), since it does not have a light guide plate, the problems of low yield rate and tendency to warping in large-sized light guide plates can be avoided.

Figure 3:
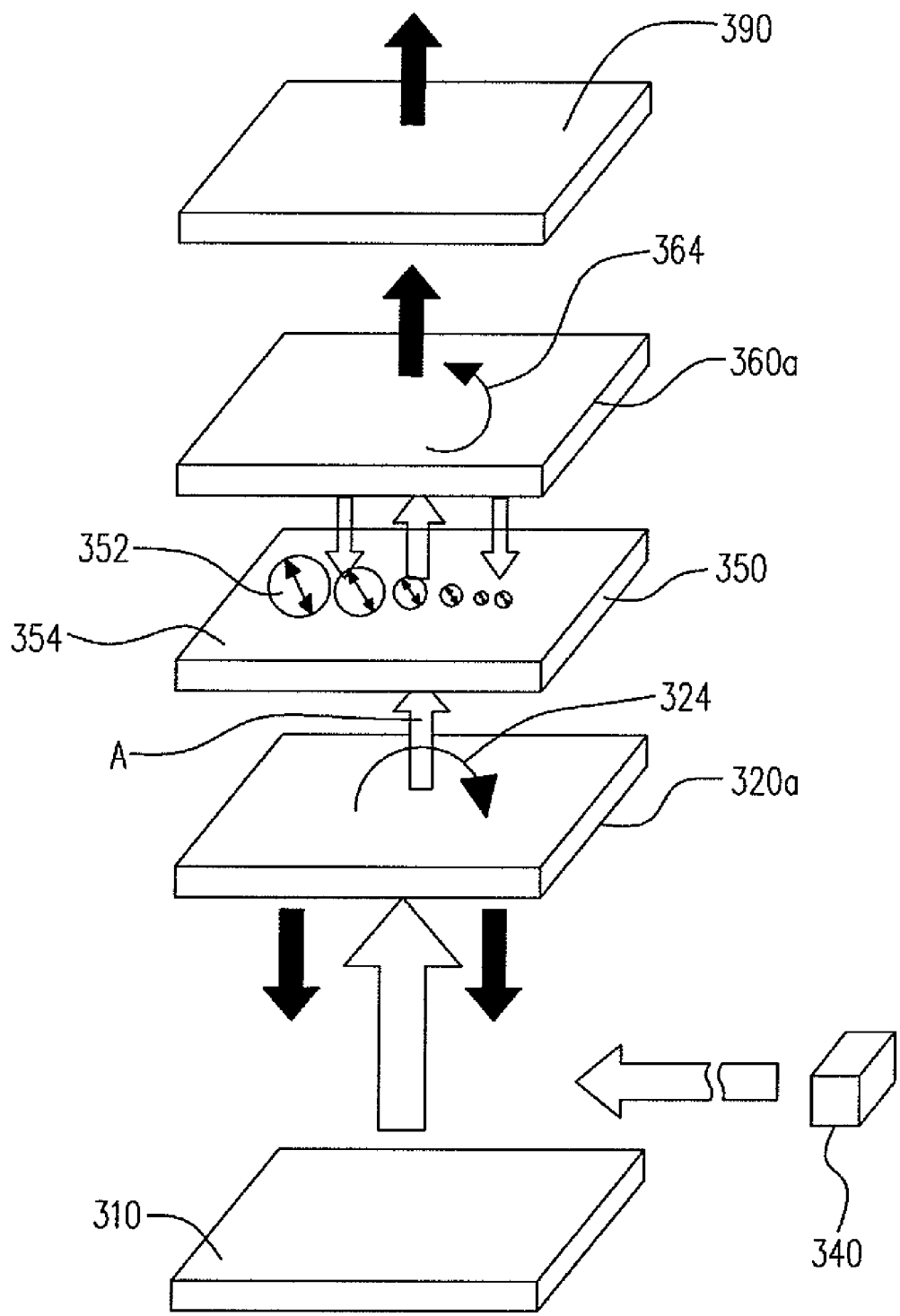
FIG. 3 is a schematic view illustrating the relative positions of the films in a backlight module according to another embodiment of the invention.

FIG. 3 is a schematic view illustrating relative positions of films in a backlight module according to another embodiment of the invention. A support and fasteners of the backlight module are not illustrated in FIG. 3. Referring to FIG. 3, in the present embodiment, a second reflective type polarizer 360a and a first reflective type polarizer 320a are circular polarizers. A circular polarization direction 324 of the first reflective type polarizer 320a is opposite to a circular polarization direction 364 of the second reflective type polarizer 360a. For example, one of the circular polarization directions 324 and 364 is clockwise, whereas the other is counterclockwise. Circular polarization directions of the light A are opposite before and after passing through the retarding regions 352. Thus, the light A passing through the retarding regions 352 may continue to pass through the second reflective type polarizer 360a. The light A passing through the non-retarding region 354 is reflected by the second reflective type polarizer 360a. A portion of the light A reflected by the second reflective type polarizer 360a is reflected by the reflection sheet 310 and thus can be utilized again after penetrating the retarder 350 and the first reflective type polarizer 320a. Further, a ¼ wavelength retarder 390 may be disposed on the second reflective type polarizer 360a. The light A coming from the second reflective type polarizer 360a changes from a circular polarizing state to a linear polarizing state after penetrating the ¼ wavelength retarder 390. This feature is suitable for LCD panels whose bright or dark state is determined by whether linear polarizing light passes through the LCD panels or not, such as the twisted nematic (TN) LCD panel, the in-plane switching (IPS) LCD panel, or the vertical alignment (VA) LCD panel.

Figure 4:
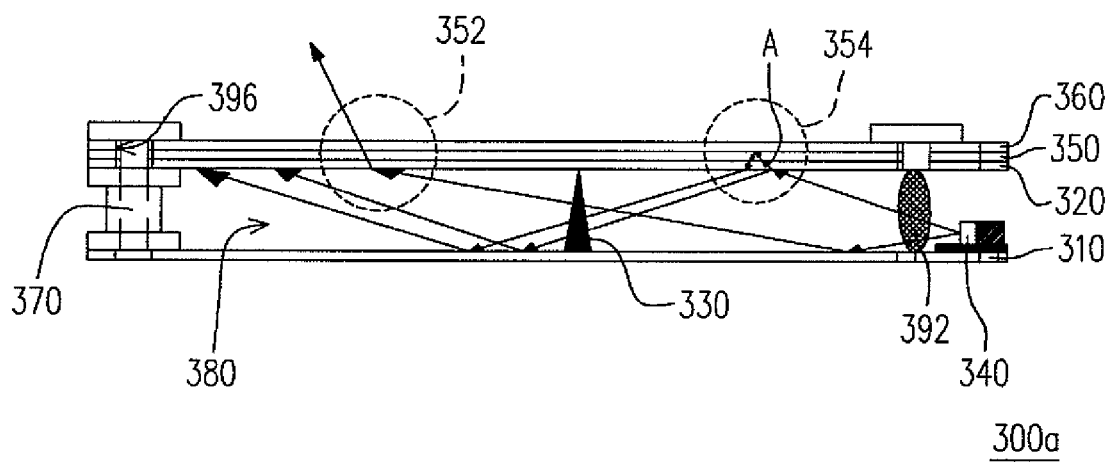
FIG. 4 illustrates a schematic cross-sectional view of a backlight module according to yet another embodiment of the invention.

FIG. 4 illustrates a schematic cross-sectional view of a backlight module according to yet another embodiment of the invention. Referring to both FIGS. 2A and 4, the backlight module 300a is approximately the same as a backlight module 300. The difference is that the backlight module 300a further includes a lens 392 disposed on a light-emitting path of the light source 340. The lens 392 is utilized to control a direction of the light A emitted by the light source 340 so as to improve the utilization the backlight module 300a has of the light source 340.

Figure 5:
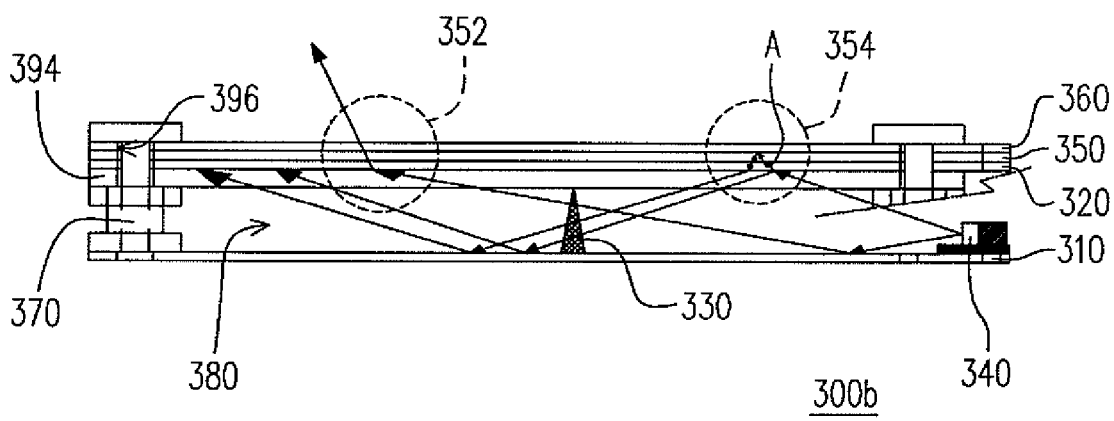
FIG. 5 illustrates a schematic cross-sectional view of a backlight module according to still another embodiment of the invention.

FIG. 5 illustrates a schematic cross-sectional view of a backlight module according to still another embodiment of the invention. Referring to FIGS. 2A and 5, the backlight module 300b is approximately the same as a backlight module 300. The difference is that the backlight module 300b further includes a transparent support plate 394 disposed between the first reflective type polarizer 320 and the support 330 so as to increase the strength of the backlight module 300b. The transparent support plate 394 is especially suitable for large-sized backlight modules. The transparent support plate 394 is fabricated using, for example, a transparent acrylic plate or other transparent materials.

Figure 6:
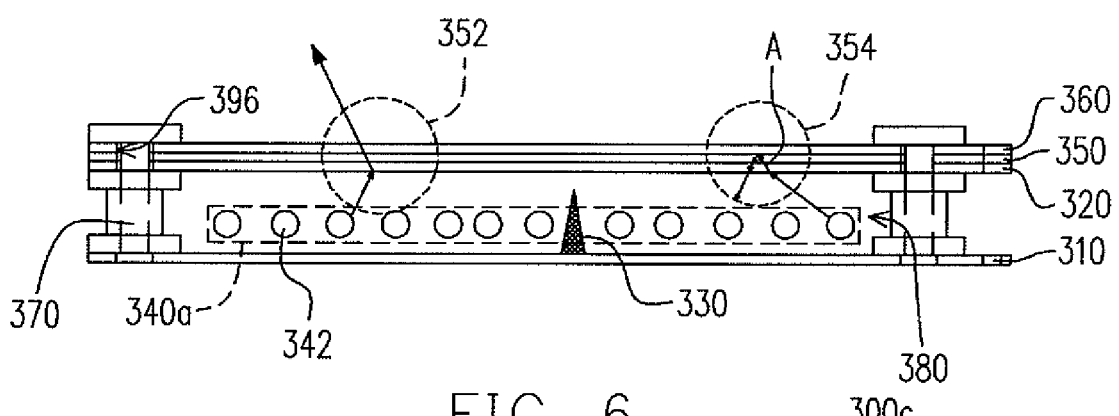
FIG. 6 illustrates a schematic cross-sectional view of a backlight module according to another embodiment of the invention.

It should be noted that the present invention does not limit the light source 340 (referring to FIG. 2A) to be disposed on the edge of the reflection sheet 310 (as in the side incident type backlight module). In another embodiment of the invention, as shown in FIG. 6, a light source 340a of a backlight module 300c includes a plurality of light-emitting elements 342 evenly distributed on the reflection sheet 310 (as in the direct type backlight module). In the embodiment as shown in FIG. 6, a total area of the retarding regions 352 per unit area on the retarder 350 increases, preferably gradually, as the retarding regions are farther away from the light-emitting elements 342. Each light-emitting element 342 is, for example, a light emitting diode (LED) or a cold cathode fluorescent lamp.

Figure 7A:
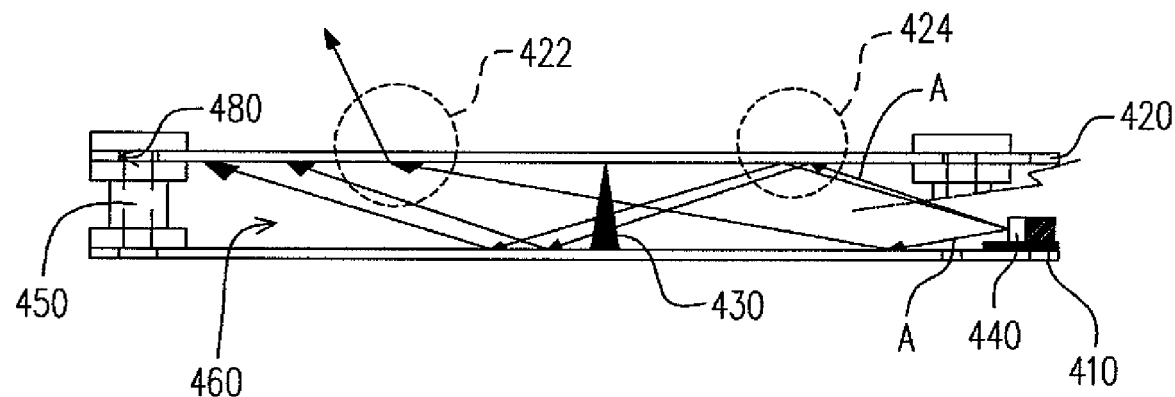
FIG. 7A illustrates a schematic cross-sectional view of a backlight module according to one embodiment of the invention.
Figure 7B:
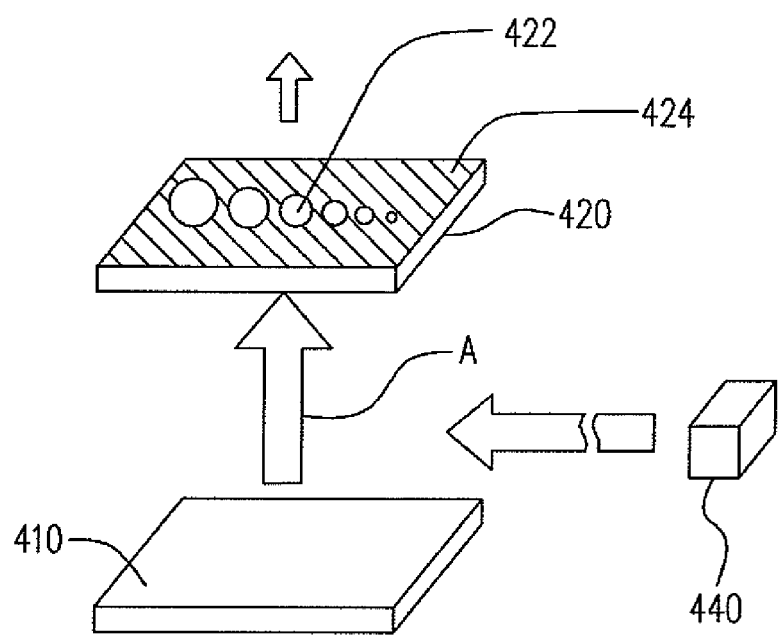
FIG. 7B is a schematic view illustrating the relative positions of the films in the backlight module of FIG. 7A.

FIG. 7A illustrates a schematic cross-sectional view of a backlight module according to one embodiment of the invention. FIG. 7B is a schematic view illustrating the relative positions of the films in the backlight module of FIG. 7A. Referring to FIGS. 7A and 7B, a backlight module 400 includes a reflection sheet 410, a selective reflection sheet 420 and at least one light source 440. The reflection sheet 410 can reflect light A from the light source 440. The selective reflection sheet 420 is disposed above the reflection sheet 410 and includes a plurality of transparent regions 422 and at least one reflective region 424. The selective reflection sheet 420 and the reflection sheet 410 form a gap 460. A method for forming the transparent regions 422 and the reflective region 424 includes, for example, selectively coating a reflective material (such as a metal or metals) on a transparent film. An area coated with the reflective material defines the reflective region 424, whereas an area not coated with the reflective material defines the transparent region 422. The light source 440 is disposed in the gap 460 between the reflection sheet 410 and the selective reflection sheet 420 to provide light A. The light source 440 is located along an edge of the reflection sheet 410 and emits light towards a central region of the reflection sheet 410, for example. Furthermore, the light source 440 includes at least one light-emitting element, and the light-emitting element may be an LED, a cold cathode fluorescent lamp or other suitable light sources.

In the present embodiment, the backlight module 400 further includes at least one support 430 disposed between the reflection sheet 410 and the selective reflection sheet 420 to maintain the gap 460. The support 430 is constituted, for example, by transparent or reflective materials. Moreover, the backlight module 400 further includes a plurality of fasteners 450 for fixing the relative positions of the reflection sheet 410 and the selective reflection sheet 420. The fasteners 450 are, for example, located at corners of the films.

A portion of the light A emitted by the light source 440 passes through the transparent regions 422. Another portion of the light A reflected by the reflective regions 424 is then reflected by the reflection sheet 410 to be utilized again. In the embodiment, a total area of the transparent regions 422 per unit area increases, preferably gradually, as the transparent regions are farther away from the light source 440. Positions and sizes of the transparent regions 422 and a number of such transparent regions per unit areas are designed in the same method as the retarding regions 352 (referring to FIG. 2C) of the backlight module 300. Hence, the backlight module 400 can provide a surface source of uniform luminance.

In addition, the reflection sheet 410 and the selective reflection sheet 420 have a plurality of through holes 480 respectively. The fasteners 450 run through the through holes 480 to fasten the reflection sheet 410 and the selective reflection sheet 420. Further, the reflection sheet 410 and the selective reflection sheet 420 may be flexible. Shapes and dimensions/diameters of the through holes 480 and an external diameter of the fastener 450 are similar to those of the through holes 396 and the external diameter C of the fasteners 370 in the backlight module 300 (referring to both FIGS. 2B and 2D) respectively.

FIG. 8 illustrates a schematic cross-sectional view of a backlight module according to another embodiment of the invention. Referring to both FIGS. 7A and 8, the backlight module 400a is approximately the same as the backlight module 400. The difference is that the backlight module 400a further includes a lens 470 disposed on a light-emitting path of the light source 440 so as to control an emitting direction of the light A from the light source 440.

FIG. 9 illustrates a schematic cross-sectional view of a backlight module according to yet another embodiment of the invention. Referring to FIGS. 7A and 9, a backlight module 400b is approximately the same as the backlight module 400. The difference is that the backlight module 400b further includes a transparent support plate 490 disposed between the selective reflection sheet 420 and the support 430 so as to increase the strength of the backlight module 400b. The transparent support plate 490 is especially suitable for large-sized backlight modules. The transparent support plate 490 is fabricated using, for example, a transparent acrylic plate or other transparent materials.

It should be noted that the present invention does not limit the light source 440 (referring to FIG. 7A) to be disposed on the edge of the reflection sheet 410 (as in the side incident type backlight module). In still another embodiment of the invention, as shown in FIG. 10, a light source 440a of a backlight module 400c includes a plurality of light-emitting elements 442 evenly distributed on the reflection sheet 410 (as in the direct type backlight module). In the embodiment as shown in FIG. 10, a total area of the transparent regions 422 per unit area increases, preferably gradually, as the transparent regions are farther away from the light-emitting elements 442. Each light-emitting element 442 is, for example, an LED or a cold cathode fluorescent lamp.

The backlight modules 400-400c in the embodiments are the backlight modules without a light guide plate, and they have the same advantages as the backlight modules 300-300c, respectively.

Figure 11:
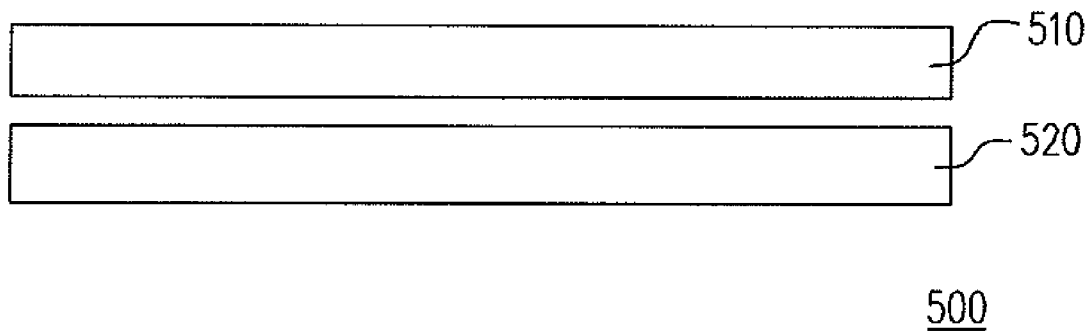
FIG. 11 illustrates a schematic view of an LCD according to one embodiment of the invention.

FIG. 11 illustrates a schematic view of an LCD according to one embodiment of the invention. Referring to FIG. 11, an LCD 500 of the embodiment includes an LCD panel 510 and a backlight module 520 disposed under the LCD panel 510. The backlight module 520 may be one of the backlight modules 300-300c and 400-400c in the aforementioned embodiments or it may be any other backlight module having the characteristics of the invention. Additionally, the backlight module 520 is disposed with its light-emitting direction towards the LCD panel 510, which means a surface source is provided by the backlight module 520 at its top side adjacent to the LCD panel 510. If the LCD panel 510 is flexible, the whole LCD 500 becomes flexible, too.

Figure 12:
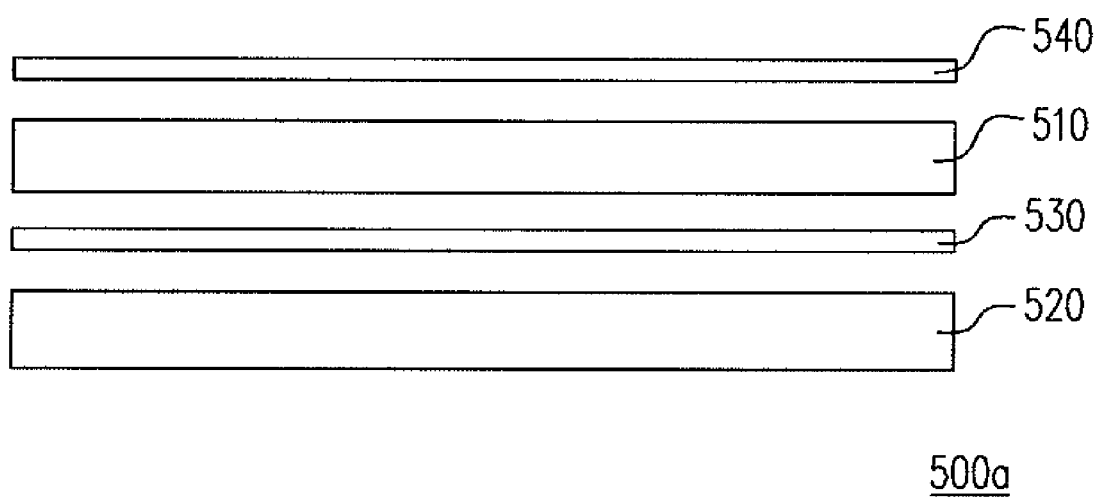
FIG. 12 illustrates a schematic view of an LCD according to another embodiment of the invention.

FIG. 12 illustrates a schematic view of an LCD according to another embodiment of the invention. Referring to FIGS. 11 and 12, an LCD 500a is approximately the same as the LCD 500. The difference is that the LCD 500a further includes a first polarizer 530 and a second polarizer 540. The first polarizer 530 is disposed between the backlight module 520 and the LCD panel 510, whereas the second polarizer 540 is disposed on the LCD panel 510. After passing through the first polarizer 530 and the second polarizer 540 respectively, linear polarization directions of light are perpendicular to each other. If the light provided by the backlight module 520 is linear polarizing light, the second polarizer 540 may be removed. The first polarizer 530 and the second polarizer 540 are suitable for LCD panels whose bright or dark state is determined by whether linear polarizing light passes through or not.

In conclusion, the backlight module of disclosed embodiments of the present invention adopts either the combination of a reflection sheet, a reflective type polarizer and a retarder or the combination of a reflection sheet and a selective reflection sheet so as to generate a surface source of uniform luminance, and no light guide plate or diffusion plate is required. Therefore, the backlight module of disclosed embodiments of the invention has the advantages of having thinner thickness and lighter weight. Moreover, the backlight module of disclosed embodiments of the invention does not include any elements that are difficult to warp, such as a light guide plate or a diffusion plate, so that it can be easily designed as a flexible type backlight module. Further, the shapes of the through holes in the films are designed as such that the backlight module of disclosed embodiments of the invention can have better flexibility and, at the same time, the films can still be solidly fastened. Besides, the backlight module of disclosed embodiments of the invention may also be applied in LCDs, and if combined with a flexible LCD panel, would advantageously result in a flexible LCD. In addition, when the backlight module of disclosed embodiments of the invention is applied to large-sized LCDs, since the backlight module does not have a light guide plate, the problems of low yield rate and tendency to warping in large-sized light guide plates can be avoided.

Although the present invention has been disclosed above by the preferred embodiments, they are not intended to limit the present invention. Anybody skilled in the art can make some modifications and alterations without departing from the spirit and scope of the present invention as defined in the appended claims.

What is claimed is:

1. A backlight module, comprising:
a reflection sheet;
a first reflective type polarizer disposed above the reflection sheet with a gap therebetween;
a light source disposed in said gap between the reflection sheet and the first reflective type polarizer to provide light;
a retarder disposed on the first reflective type polarizer, the retarder having a plurality of retarding regions and a non-retarding region; and
a second reflective type polarizer disposed on the retarder, wherein
the light provided by the light source penetrates the second reflective type polarizer through the functioning of the retarding regions, and
a total area of the retarding regions per unit area of the retarder increases as the retarding regions are farther away from the light source.

2. The backlight module of claim 1, wherein the first reflective type polarizer and the second reflective type polarizer are linear polarizers, and a linear polarization direction of the first reflective type polarizer and a linear polarization direction of a light passing the second reflective type polarizer are perpendicular to each other.

3. The backlight module of claim 1, wherein the first reflective type polarizer and the second reflective type polarizer are circular polarizers, and a circular polarization direction of the first reflective type polarizer and a circular polarization direction of the second reflective type polarizer are opposite to each other.

4. The backlight module of claim 3, further comprising a ¼ wavelength retarder disposed on the second reflective type polarizer.

5. The backlight module of claim 1, being a side incident type backlight module wherein the light source is located along an edge of the reflection sheet and emits light towards a central region of the reflection sheet.

6. The backlight module of claim 5, further comprising a lens disposed on a light-emitting path of the light source.

7. The backlight module of claim 1, being a direct type backlight module wherein the light source comprises a plurality of light-emitting elements evenly distributed on the reflection sheet.

8. The backlight module of claim 1, further comprising a plurality of fasteners for fixing relative positions of the reflection sheet, the first reflective type polarizer, the retarder and the second reflective polarizer.

9. The backlight module of claim 8, wherein the reflection sheet, the first reflective type polarizer, the retarder and the second reflective type polarizer have a plurality of through holes respectively, the fasteners running through the through holes to fasten the reflection sheet, the first reflective type polarizer, the retarder and the second reflective type polarizer, a largest dimension of at least one of the through holes being larger than a largest external diameter of the respective fasteners.

10. The backlight module of claim 9, wherein the reflection sheet, the first reflective type polarizer, the retarder and the second reflective type polarizer are flexible.

11. The backlight module of claim 1, further comprising a support disposed between the reflection sheet and the first reflective type polarizer to maintain the gap.

12. The backlight module of claim 11, further comprising a transparent support plate disposed between the first reflective type polarizer and the support.

13. The backlight module of claim 1, wherein the retarder is a ½ wavelength retarder.

14. A liquid crystal display (LCD), comprising:
an LCD panel; and
a backlight module, the backlight module comprising:
a reflection sheet;
a first reflective type polarizer disposed above the reflection sheet with a gap therebetween;
a light source disposed in said gap between the reflection sheet and the first reflective type polarizer to provide light;

a retarder disposed on the first reflective type polarizer, the retarder having a plurality of retarding regions and a non-retarding region; and a second reflective type polarizer disposed on the retarder, wherein the light provided by the light source penetrates the second reflective type polarizer through the functioning of the retarding regions, and a total area of the retarding regions per unit area of the retarder increases as the retarding regions are farther away from the light source.

15. The LCD of claim 14, further comprising:

a first polarizer disposed between the backlight module and the LCD panel; and a second polarizer disposed on the LCD panel, wherein linear polarization directions of the first polarizer and the second polarizer are perpendicular to each other.

16. A backlight module, comprising:

a reflection sheet;

a first reflective type polarizer disposed above the reflection sheet with a gap therebetween;

a light source disposed in the gap between the reflection sheet and the first reflective type polarizer to provide light;

a retarder disposed on the first reflective type polarizer, the retarder having a plurality of retarding regions and a non-retarding region; and a second reflective type polarizer disposed on the retarder, wherein the light provided by the light source penetrates the second reflective type polarizer through the functioning of the retarding regions, the backlight module further comprises a plurality of fasteners for fixing relative positions of the reflection sheet, the first reflective type polarizer, the retarder and the second reflective polarizer, the reflection sheet, the first reflective type polarizer, the retarder and the second reflective type polarizer have a plurality of through holes respectively, the fasteners running through the through holes to fasten the reflection sheet, the first reflective type polarizer, the retarder and the second reflective type polarizer, a largest dimension of at least one of the through holes being larger than a largest external diameter of the respective fasteners, and the reflection sheet, the first reflective type polarizer, the retarder and the second reflective type polarizer are flexible.

* * * * *